V. M. MONTSINGER.
TEMPERATURE INDICATOR.
APPLICATION FILED AUG. 21, 1916.

1,269,546.  Patented June 11, 1918.

Inventor:
Vincent M. Montsinger,
by
His Attorney.

UNITED STATES PATENT OFFICE.

VINCENT M. MONTSINGER, OF PITTSFIELD, MASSACHUSETTS, ASSIGNOR TO GENERAL ELECTRIC COMPANY, A CORPORATION OF NEW YORK.

TEMPERATURE-INDICATOR.

1,269,546.    Specification of Letters Patent.    Patented June 11, 1918.

Application filed August 21, 1916. Serial No. 116,214.

*To all whom it may concern:*

Be it known that I, VINCENT M. MONTSINGER, a citizen of the United States, residing at Pittsfield, county of Berkshire, State of Massachusetts, have invented certain new and useful Improvements in Temperature-Indicators, of which the following is a specification.

My invention relates to a device for indicating the interior temperature of a transformer, and has for its object the provision of a simple and effective device of this character.

It is well known that the temperature of a transformer rises when the same is in use, and that there will be a certain spot technically known as the "hot spot", which will have a higher temperature than the remainder of the transformer. Now, the rate at which a transformer can safely convert electrical energy is limited by the temperature of the hot spot. This spot is located within the transformer, and temperature readings of the exterior of the transformer do not afford accurate information as to the temperature of the hot spot, and since this precise temperature is unknown, it is necessary either to run the transformer at such a load that it will be reasonably certain that the hot spot is below the critical temperature, or else to depart from the limits of safe operation and load the transformer more heavily. In the former case, the efficiency of the transformer is unnecessarily low, and in the latter case the critical temperature of the hot spot is liable to be passed, with the result that the transformer will be injured.

In accordance with my present invention, a temperature indicator is provided which affords a ready and accurate indication of the temperature of the hot spot. It comprises a temperature responsive device located within a spacing block between the coils of the transformer and preferably adjacent to the hot spot.

Figure 1:
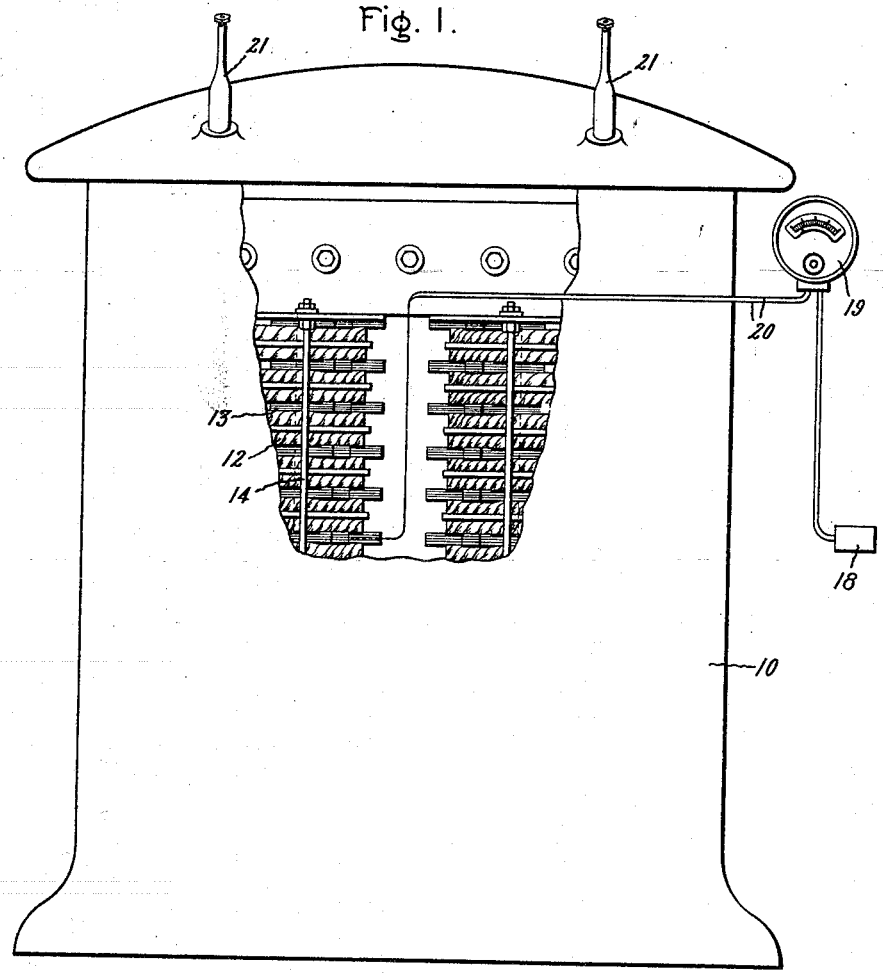
Figure 2:
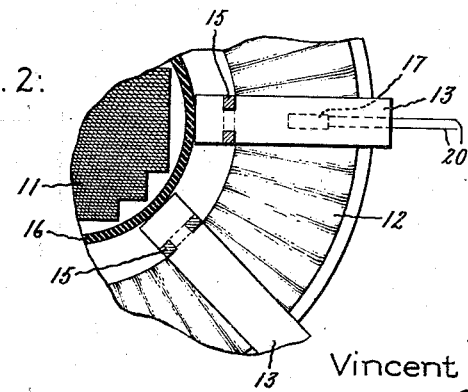

My invention will best be understood by reference to the accompanying drawings, in which like reference numerals are applied to corresponding parts, and in which Figure 1 is a side elevation of a transformer embodying one form of my invention, and Fig. 2 is a cross section of a portion thereof.

Referring now to the drawings, 10 is the casing of the transformer within which is located the transformer proper comprising a core 11, the legs of which are surrounded by the coils 12 which are here shown as of the interleaved disk type. The various coils are separated by insulating spacing blocks 13. The various parts of the stack are held together by clamping bars 14. The spacing blocks 13 may be locked in position by insulating bars 15, the inner ends of the spacing blocks abutting against an insulating cylinder 16. The mechanical structure of these parts of the device constitutes no part of my present invention, and since these details are fully disclosed in Patent #1,159,770, which was issued November 9th, 1915, to Russell M. Hyde, reference may be made thereto for further details in regard to the mechanical construction.

In accordance with my present invention, a temperature responsive element 17, such for example, as a thermocouple or a resistance element, is disposed within that spacing block which is nearest to the hot spot of the transformer. The location of this spot varies in different types and sizes of transformers, and has been or may be determined by experiment for various types so that for a given type of transformer the position of the hot spot may be fairly closely located. I have found in practice that the temperature of the insulating block within which the element is mounted varies in step with that of the hot spot, so that a reading of the temperature of the insulating block affords a sufficiently accurate indication of the temperature of the hot spot. The location of the temperature responsive element within the spacing block does not injuriously affect the insulating properties of the block, in view of the fact that in designing these blocks, it is generally necessary to make them considerably larger than considerations of insulation would require, in order to permit free and sufficient circulation of the cooling fluid within the same, and thereby permit the heat to be carried away. There is, therefore, generally a wide margin of safety as regards the insulating properties of the spacing blocks. I have here illustrated the temperature responsive element as a thermocouple in connection with which is used an outside element 18 and an indicating device 19, connected to the outside element and to the temperature responsive element by wires or bars 20, in the usual manner. The operation and construction of a temperature indicating device of this character is well understood in the art, and need not here be further described. Two of the usual terminals of the transformer are indicated at 21.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In combination with a transformer provided with windings separated by insulating spacing blocks, means for indicating the interior temperature of said transformer comprising a temperature responsive element disposed within one of said blocks.

2. In combination with a transformer provided with windings separated by insulating spacing blocks, a temperature responsive element disposed within one of said blocks, and means located without the transformer for indicating the temperature of said element.

3. In combination with a transformer provided with interleaved disk windings separated by insulating spacing blocks, means for indicating the temperature of the hot spot of said transformer comprising a temperature responsive element disposed within a block adjacent said spot and also comprising a device located without the transformer for indicating the temperature of said element.

4. In an electric apparatus provided with a plurality of coils in which heat is developed during operation, the combination of spacing blocks located between the coils which are larger than considerations of insulation require, a temperature responsive device disposed within one of said blocks, and means for indicating the temperature of said device.

In witness whereof, I have hereunto set my hand this 17th day of Aug., 1916.

VINCENT M. MONTSINGER.